United States Patent [19]

Green

[11] Patent Number: 4,637,352

[45] Date of Patent: Jan. 20, 1987

[54] STEAM BOOSTED INTERNAL COMBUSTION ENGINE

[76] Inventor: Marion A. Green, P.O. Box 205, Kilbourne, La. 71253

[21] Appl. No.: 464,370

[22] Filed: Feb. 7, 1983

[51] Int. Cl.$^4$ ............................................. F02M 25/02
[52] U.S. Cl. ................................. 123/25 P; 123/25 D
[58] Field of Search ................. 123/25 B, 25 D, 25 P, 123/25 C

[56] References Cited

U.S. PATENT DOCUMENTS

| | | | |
|---|---|---|---|
| 1,068,414 | 7/1913 | Courtenay | 123/25 P |
| 1,626,335 | 4/1927 | Farnham | 123/25 D |
| 1,676,264 | 7/1928 | Hill | 123/25 D |
| 4,122,803 | 10/1978 | Miller | 123/25 D |

Primary Examiner—Ira S. Lazarus
Attorney, Agent, or Firm—Morris S. Borenstein

[57] ABSTRACT

The fuel consumption of an internal combustion engine is decreased by the sue of steam, wherein the steam is produced by maintaining a constant flow of water past the internal combustion engine which acts as the boiler, without the need for any external source of heat. The steam that is produced is injected in a timed, pulsed manner into the engine at such a time as to allow the expansion of the steam in the chamber to supplement the expansion of the gases caused by the explosion of the fuel consumed.

5 Claims, 2 Drawing Figures

STEAM BOOSTED INTERNAL COMBUSTION ENGINE

BACKGROUND OF THE INVENTION

1. Field of the Invention

This invention deals generally with a means for increasing the fuel efficiency of an internal combustion engine and more specifically with a means for injecting steam created by the heat generated by the engine into any internal combustion engine wherein expansion of the injected steam supplements the power provided by the combustion of the fossil fuel within the engine.

2. Description of the Prior Art

There have been numerous attempts to develop a means to allow steam to be used to supplement the power of an internal combustion engine. The need has grown especially in the last decade, since the cost of fossil fuels has increased so dramatically.

Some prior art describes methods of heating water by the engine without the need of an external boiler, but none teach the method of the present invention, wherein the steam is superheated and its injection is direct into the cylinder.

None of the prior art describes a mechanism externally mounted to the engine wherein the mechanism maintains a constant flow of superheated steam to the cylinders.

SUMMARY OF THE INVENTION

The use of fossil fuel in internal combustion engines has created a serious problem. Over the past decade, due to various political and social changes in the world, the price of fossil fuels has increased dramatically and become a cause of the worldwide recession. Any decrease in the consumption of these fuels would be a boon to national and international economic and social stability.

The internal combustion engine works on the basic principle of the admission of a fossil fuel into a chamber, its burning therein and the subsequent production of mechanical energy caused by its heat of combustion. Unfortunately, most of the heat generated by the combustion of the fossil fuels is wasted. The excess heat comes out of the exhaust system in the form of pollutants at high temperatures and is dispersed into the atmosphere. These pollutants cause great harm to our environment and have necessitated using anti-pollution catalytic converters. Although these anti-pollution devices decrease some types of air pollution, they increase other kinds. However, all anti-pollution devices have the effect of decreasing the fuel efficiency of the engines to which they're attached.

This invention is a device, which can be mounted externally to any existing internal combustion engine or embodied within the design of any future engine. A flow of a small volume of water at constant high pressure is maintained past the exhaust ports of an internal combustion engine. The burning of fossil fuel within the engine generates the heat necessary to convert the water to superheated steam.

There is no need for any boiler other than the waste heat of the engine. This superheated steam is then injected into the engine and its expansion into the cylinder supplements the power produced by the combustion of the fossil fuel. Therefore, far less fossil fuel is burned. As less fossil fuel is burned, fewer pollutants are emitted.

In addition to the reduced emission of pollutants, those that are emitted are washed out of the air by the condensation of the waste water resulting from the steam that was injected into the engine. The combination of reduced burning of fossil-fuel and the "washing out" of the pollutants could eliminate the need for catalytic converters.

The present invention uses an air over hydraulic water pump to maintain a constant flow of water past the exhaust ports of an internal combustion engine and then and using the heat existing at those ports to heat the water far beyond it boiling point. The superheated steam is then injected directly into the engine, wherein the injection is timed to coincide with the engine's pistons being at either the apex of its compression stroke or at the very beginning of its power stroke. The expansion of the superheated steam into the larger chamber of the cylinder supplements the power output resulting from the combustion of the fuel.

The work produced by the steam is what results in the fuel savings.

DETAILED DESCRIPTION OF PREFERRED EMBODIMENT(S)

Figure 1:
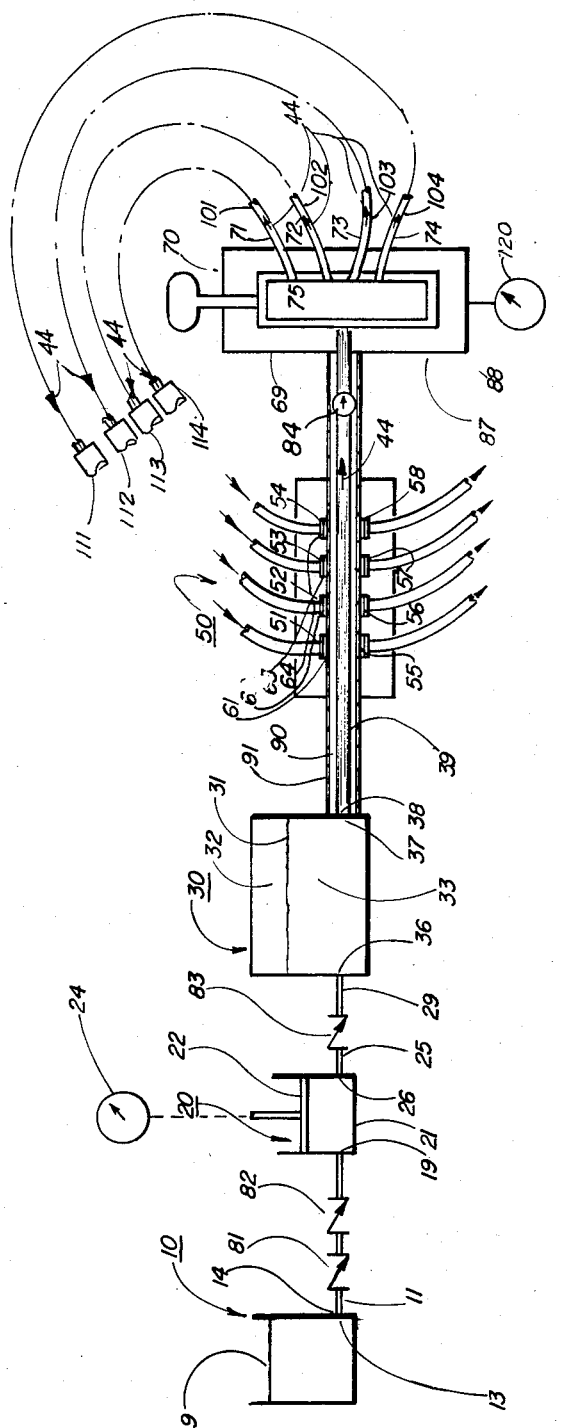
FIG. 1 is side view of the device as it is mounted on a typical automobile internal combustion engine.
Figure 2:
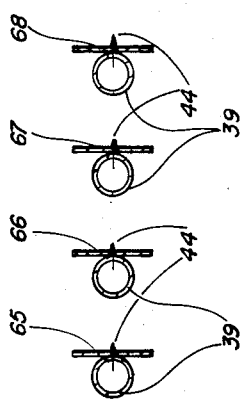
FIG. 2 illustrates a frontal of each of the four separate heating elements, i.e. that part of the device that passes immediately outside of the cylinders of the internal combustion engine.

The following is a description of the attachment of the device to a four-cylinder internal combustion engine, although the system can be used with any size internal combustion engine, regardless of the fossil fuel burned by the engine.

A water storage tank 10 is filled with water 9. Conical conduit 11 is permanently attached to water storage tank 10 by weld means 14. Water storage tank 10 also contains escape port 13, which allows the water 9 to flow directly into conduit 11.

Within conical conduit 11, are two one-way check valves 81 and 82, connected in series. One-way check valves 81 and 82 permit the water 9 to only flow in one direction, i.e., outward from water storage tank 10. Conical conduit 11 has a greater internal diameter 18 at the site of its confluence with escape port 13, than it does at port 19, where the internal diameter is represented by 17.

Conical conduit is permanently attached by weld means 15 to pressure chamber 20. Pressure chamber 20 contains cylinder 21 and piston 22. The water 9 flows through port 19 of conical conduit 11 into cylinder 21 of pressure chamber 20. Therefore, port 19 also serves as the inlet means for water 9 into cylinder 21. Cylinder 21 also contains port 26. Piston 22, which is tightly seated within by conventional means cylinder 21 pumps the water 9 out of cylinder 21 thru port 26. The conventional vertical stroke of piston 22 is controlled by an external timing device 24.

When the water 9 is pumped out of cylinder 21 thru port 26 by piston 26, it enters conical conduit 25. Conical conduit 25 has a larger internal diameter 28 at port 26 than its internal diameter 29 at port 36. Conical conduit 25 contains one-way check valve 83, which only permits flow out of pressure chamber 20 into pressure stabilizing tank 30.

Pressure stabilizing tank 30 contains a constant volume of water 33 and an inert gas 32, e.g. neon. Water 9 enters pressure stabilizing tank 30 through port 36. Port 36 is situated below the water level 31. Pressure stabilizing tank 30 also contains port 37, which is located below the water line 31 and at a level below port 36. The water 9 which flows into pressure stabilizing tank 30 blends with the constant volume of water 33, and the combined flow 38 exits through port 37 into conduit 39.

Conduit 39 is surrounded by insulation 90, which is contained within a rigid insulating material 91. Conduit 39 contains one-way check valve 84, which only permits flow exiting pressure stabilizing tank 30. Conduit 39 is conical in cross-section as its internal diameter 45 at port 37 is greater than the internal diameter 46 at port 69. Insulation 90 and container 91 surround conduit 39, except at engine 50 exhaust ports 51, 52, 53 and 54.

Conduit 39 is permanently and rigidly seated within specially-designed 61, 62, 63 and 64, which are permently and rigidly sealed between engine exhaust ports 51, 52, 53 and 54 and exhaust pipes 55, 56, 57 and 58, respectively. Withing gaskets 61, 62, 63 and 64 conduit 39 has heat-absorbing plates 65, 66, 67 and 68 attached. Conduit 39 is thin-walled has a high conductivity and low malleability, as are heat absorbing plates 65, 66, 67 and 68. Furthermore, the internal diameter of conduit 39 is extremely and at all times contains only a small volume of water 38.

The flow 38 is heated to form superheated steam 44 by the heat present at engine exhaust ports 51, 52, 53 and 54. The flow of superheated steam 44 then flows through port 69 into four-way stopcock 70. Four-way stopcock 70 contains plug 75. Plug 75 contains pathways 71, 72, 73 and 74. Plug 75 rotates in accordance with timing device 120. Upon rotation, pathways 71, 72, 73 and 74 allow the superheated steam 44 to flow from port 69 to conduits 101, 102, 103 and 104 respectively. Superheated steam 44 flows through conduits 101, 102, 103 and 104 into cylinders 111, 112, 113 and 114 of engine 50.

The flow of superheated steam 44 into cylinders 111, 112, 113 and 114 is timed by timing device 120 so that the superheated steam 44 is injected into cylinders 111, 112, 113, and 114 at the very top of the pistons 115, 116, 117 and 118 compression stroke, or at the immediate beginning of the said pistons 115, 116, 117 and 118 power stroke.

Pathways 71, 72, 73 and 74, plug 75, and conduits 101, 102, 103 and 104 are all made of non-heat conducting materials and are surrounded with two layers of insulating material, 87 and 88.

Although there has been described above a specific arrangement of a steam booster system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed:

1. A device to supplement the power produced by burning fuel in an internal combustion engine with steam, said device comprising:
    a means for producing a constant flow of water past a boiler means;
    a means for allowing the said water to flow in the direction of the said boiler;
    a boiler means external to the said internal combustion engine to convert the said water into superheated steam; a means for controlling the pressure of the said water such that the said water pressure is greater than the pressure of the said steam produced by the said boiler; and
    a means for injection of the said superheated steam directly into a cylinder of the said internal combustion engine, a means for producing a constant flow of water at a pressure greater than the pressure of said superheated steam, wherein said constant flow means at greater pressure comprises a chamber with a gaseous component, with said gaseous component being of constant volume and exerting constant pressure upon water within the said chamber.

2. The boiler means described in claim 1 wherein the said boiler means is the heat radiating from the exhaust system of the said internal combustion.

3. The injection means described in claim 1, wherein the said injection means is a timed, pulsed injection control by an external timing device.

4. The device in claim 3, wherein the said timed, pulsed injection of steam is maintained at a pressure wherein the said timed, pulsed injection of steam is less than the said water pressure.

5. The device in claim 1, wherein the said means for allowing the said water to flow in the direction of the said boiler comprises a uni-directional valve means.

* * * * *